Aug. 26, 1969  G. J. CRANDALL  3,463,703
FUEL PIN SPACERS
Filed July 24, 1968  2 Sheets-Sheet 1
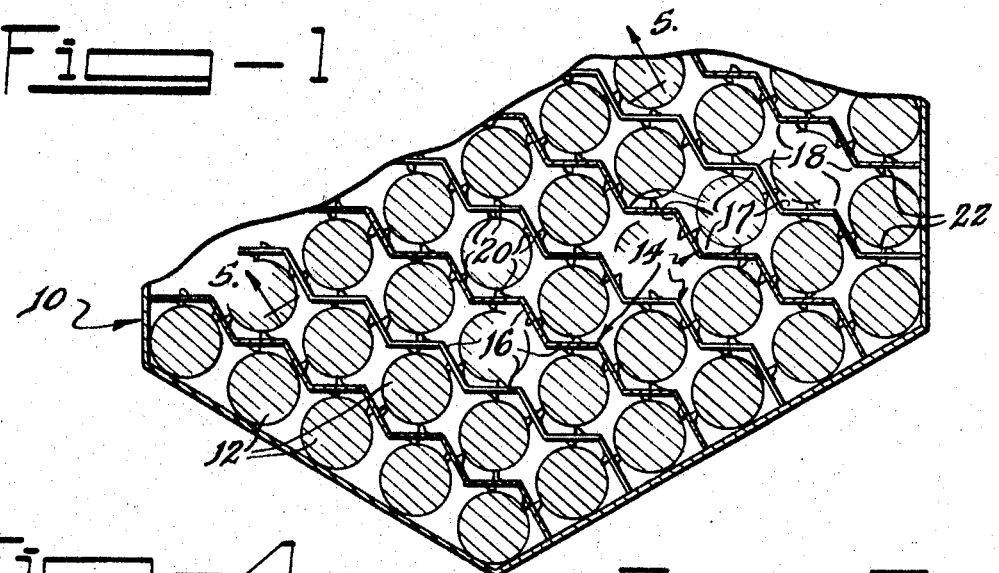
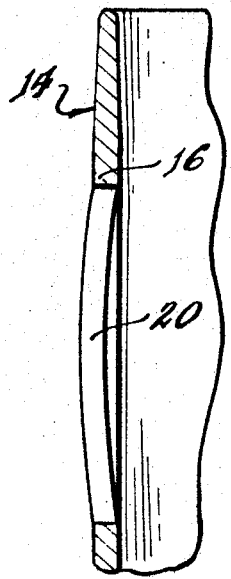
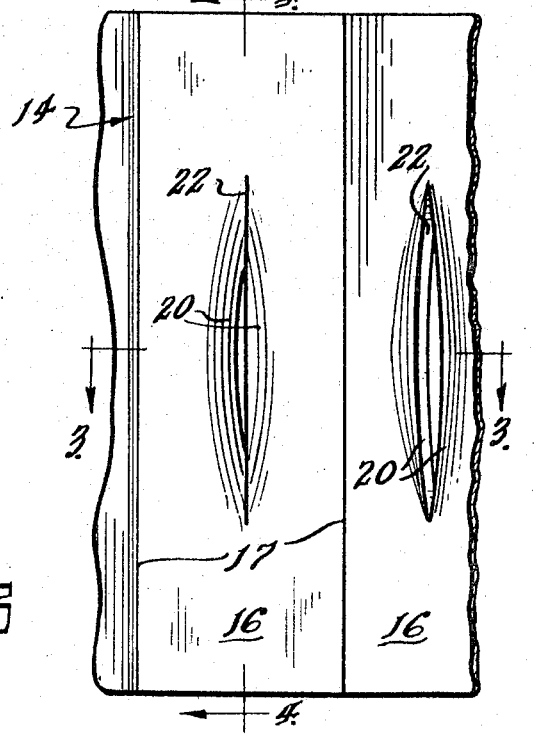
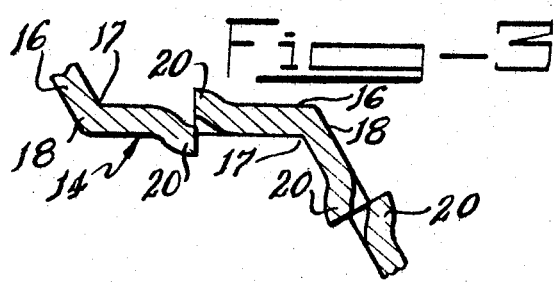
Inventor
Gary J. Crandall
By:
Attorney Inventor
Gary J. Crandall Attorney

United States Patent Office 3,463,703
Patented Aug. 26, 1969

3,463,703
FUEL PIN SPACERS
Gary J. Crandall, Northport, Wash., assignor to the United States of America as represented by the United States Atomic Energy Commission
Filed July 24, 1968, Ser. No. 747,320
Int. Cl. G21c 3/34
U.S. Cl. 176—78    6 Claims

ABSTRACT OF THE DISCLOSURE

A nuclear reactor fuel pin spacer assembly consisting of parallel strips of joined V's transverse of and between the fuel pins, each V containing a fuel pin which is supported by protuberances extending from the sides of the V.

CONTRACTUAL ORIGIN OF THE INVENTION

The invention described herein was made in the course of, or under, a contract with the United States Atomic Energy Commission.

BACKGROUND OF THE INVENTION

This invention relates to fuel subassemblies for nuclear reactors. More specifically, this invention relates to an apparatus for spacing and supporting nuclear reactor fuel pins within a fuel subassembly.

Within nuclear reactors are many fuel subassemblies which go to make up the reactor core. Many of these subassemblies are made up of large numbers of fuel pins which are placed in an orderly array or lattice within the subassembly. This lattice may be in the form of a triangle, square or oblong rectangle. These fuel pins are long thin cylindrical rods containing the nuclear fuel. Because of their construction, support and spacing of the fuel pins within the subassembly is important. The dimensions of the subassembly must be held to close tolerances and cannot be disrupted by the fuel pins.

In fuel element subassemblies it is important that fuel pin spacers be simple in design for ease of fabriction of the spacers and for ease in placing the pins into the subassembly. A minimum amount of contact between the spacer and the individual fuel pins is desirable to permit maximum heat removal from the pins and to eliminate hot spots which may develop. The spacers should present a minimum amount of surface to the coolant flow so that pressure drop through the core will be as little as possible. Stability of the spacers is also of prime consideration.

SUMMARY OF THE INVENTION

The assembly of the present invention comprises a plurality of parallel strips having a series of flat sections transverse of and between rows of fuel pins. The flat sections are bent with respect to each other to form a row of V's connected at their edges, each V on either side of the strip containing a fuel rod. Each flat section has two protuberances, one on either side and extending in opposite directions to support the fuel element on either side of the strip.

BRIEF DESCRIPTION OF THE DRAWINGS

FIG. 1 is a plan view of a portion of a fuel subassembly showing fuel pins on a triangular lattice and the parallel rows of spacing strips between the pins.

FIG. 2 is a view of the flat sections which make up the strips.

FIG. 3 is a transverse sectional view along line 3—3 in FIG. 2.

FIG. 4 is a cross-sectional view along line 4—4 in FIG. 2.

DESCRIPTION OF THE PREFERRED EMBODIMENT

Figure 5:
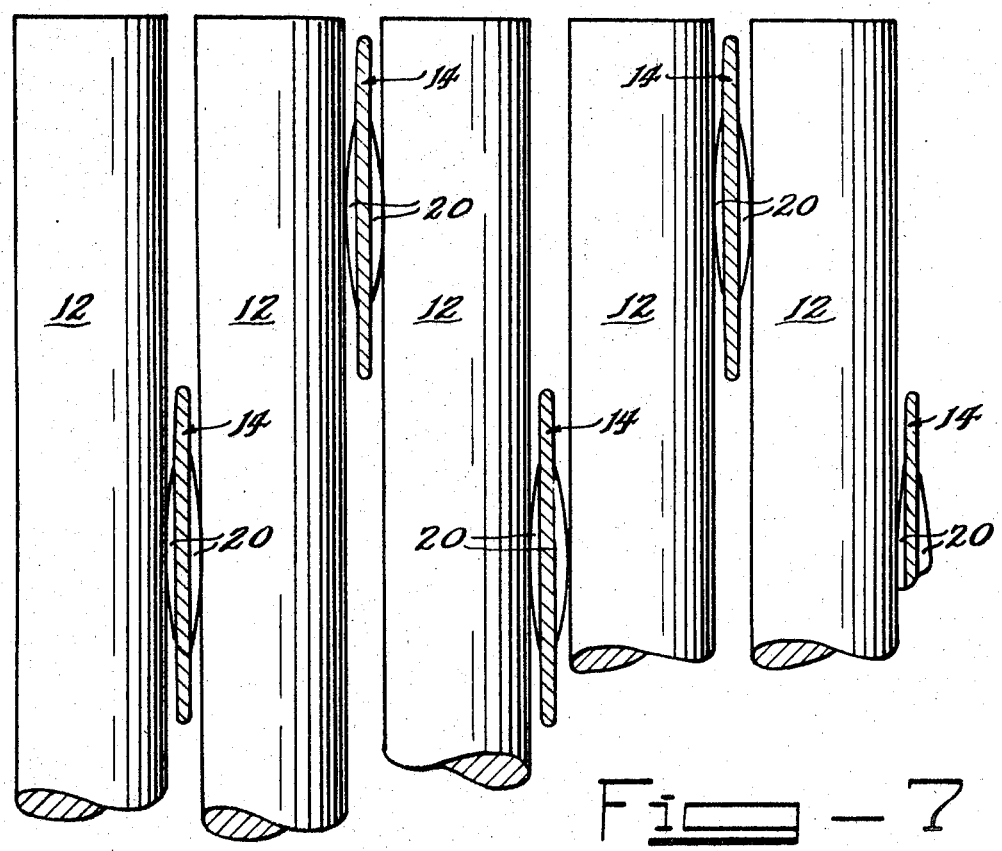
FIG. 5 is a cross-sectional view along line 5—5 in FIG. 1.

In FIG. 1 there is shown a plan view of a portion of a fuel element subassembly 10 comprising a plurality of fuel pins 12 arranged on a triangular lattice, and separated by parallel spacing strips 14 transverse of and between fuel pins 12. Each spacing strip 14 comprises a plurality of flat sections 16 of equal length bent with respect to each other to form equal angles 17, adjacent angles being opposite in direction to form a straight row of V's 18 having equal sides, joined at their outer edges, each V 18 on both sides of strip 14 containing a fuel pin 12 spaced from the V 18 by protuberance 20 extending from either face of flat section 16 to prevent lateral movement of pins 12.

Referring now to FIGS. 2, 3 and 4, protuberances 20 are located an equal distance from angles 17 on either side of flat section 16, extend in opposite directions from either face of section 16 and are separated by slit 22, which is parallel to fuel rod 12. Protuberances 20 are bowed gradually outward at their centers to provide a small area of content with fuel rods 12 on either side of flat section 16.

Thus each V 18 formed by two flat sections will support a fuel pin 12 at two points about its circumference and two parallel spacer strips 14 will support fuel pins 12 situated between them at four points about the circumference of each pin.

FIG. 5 is a view along line 5—5 of FIG. 1 showing fuel rods 12 separated by spacer strips 14 and supported by protuberances 20, extending from either face of spacer strip 14. Adjacent strips 14 are situated on different planes within the fuel subassembly and the upper edge of every other strip 14 is on the same plane to permit a smoother flow of coolant through the subassembly and decrease the pressure drop. Spacing strip 14 is convex in cross section to further reduce pressure drop of the coolant as it flows through the subassembly and to permit smooth coolant flow.

Figure 6:
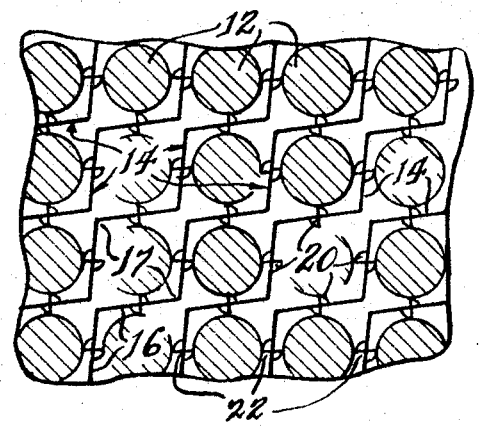
FIG. 6 is a plan view of another embodiment of the spacer arrangement of this invention showing the spacer strips supporting fuel pins arranged on a square lattice.

FIG. 6 is another embodiment of the present invention in which fuel pins 12, arranged on a squared lattice, are separated by spacer strip 14 and supported by protuberances 20. The embodiment is similar to that shown in FIG. 1, differing in angle 17 and length of flat section 16 necessary to accommodate the different lattice formation.

Figure 7:
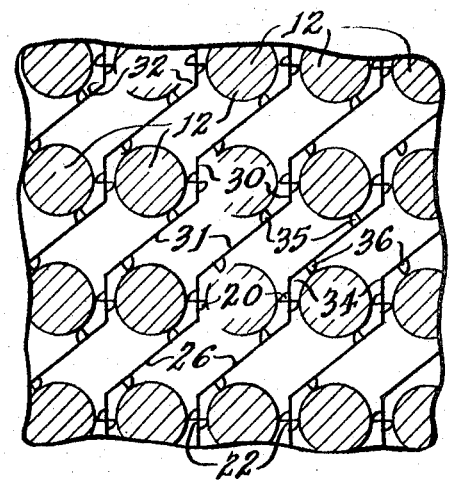
FIG. 7 is a plan view of still another embodiment of this invention showing the spacer strips supporting fuel pins arranged on an oblong rectangle lattice.

Still another embodiment is shown in FIG. 7 where fuel pins 12 are arranged on an oblong rectangule lattice and are separated by spacer strips 26. Each spacer strip 26 comprises a first plurality of relatively short flat sections 30 of equal length and a second plurality of relatively long flat sections 31 of equal length. The sections 31 and the sections 30 alternate with one another so that equal angles 32 are formed. Thus a straight row of V's 34 having unequal sides is formed. As in the modification of FIGS. 1–4, each short section 30 has a pair of protuberances 20 which are formed at opposite sides of the short section and are located at the slit 22 in the short section so as to be generally directly opposite one another. Each long section 31, however, has protuberances 35 and 36, which, though extending from opposite sides of the long section, are not opposite one another but well displaced from one another and are formed at separate slits well spaced from one another. Each V 34 contains a fuel pin 12 spaced an equal distance from the short section 30 and long section 31 and supported by the protuberance 20 and the protuberance 35 or 36.

It will be understood that the invention is not to be limited to the details given herein but that it may be modified within the scope of the appended claims.

The embodiments of the invention in which an exclusive property or privilege is claimed are defined as follows:

1. A nuclear reactor fuel assembly comprising:
   (a) a plurality of parallel nuclear fuel pins arranged in a regular array;
   (b) a plurality of parallel spacing strips transverse of and between the nuclear fuel pins;
      (1) each strip being formed of a plurality of flat sections bent with respect to each other, the angles so formed between each section being the same and adjacent angles being opposite in direction to form a straight row of joined V's, said strips being so positioned that a nuclear fuel pin is received in each V;
      (2) protuberances, extending in opposite directions from opposite faces of said section, said pins on each side of said strip, thereby preventing lateral movement of said pins.

2. The assembly of claim 1 wherein each flat section is the same size as every other flat section.

3. The assembly of claim 2 wherein the protuberances are located an equal distance from said angles and are separated by a split parallel to said fuel pins.

4. The assembly of claim 3 wherein adjacent spacing strips are on different planes and the top of every other strip is one the same plane.

5. The assembly of claim 1 wherein each strip is formed of a first plurality of relatively short flat sections of equal length and a second plurality of relatively long flat sections of equal length, said short sections alternating with said long sections, thereby forming a straight row of V's having unequal sides; and said protuberances on said short section being generally opposite each other and separated by a split parallel to said fuel pins, said protuberances on said long sections being displaced from one another and formed at slits well spaced from one another.

6. The assembly of claim 5 wherein adjacent spacing strips are on different planes and the top of every other strip is on the same plane.

References Cited
UNITED STATES PATENTS

| | | | |
|---|---|---|---|
| 3,104,218 | 9/1963 | Speidel et al. | 176—78 |
| 3,158,549 | 11/1964 | Fowler | 176—78 |
| 3,228,854 | 1/1966 | Bekkering et al. | 176—78 |
| 3,255,090 | 6/1966 | Leirvik | 176—78 |
| 3,260,649 | 7/1966 | Jens et al | 176—76 X |
| 3,301,765 | 1/1967 | Eyre et al. | 176—76 X |
| 3,317,399 | 5/1967 | Winders | 176—76 X |
| 3,350,275 | 10/1967 | Venier et al. | 176—76 X |
| 3,366,546 | 1/1968 | Anthony et al. | 176—78 X |
| 3,369,973 | 2/1968 | Voigt et al. | 176—78 |

CARL D. QUARFORTH, Primary Examiner

MELVIN J. SCOLNICK, Assistant Examiner

U.S. Cl. X.R.

176—66

UNITED STATES PATENT OFFICE
CERTIFICATE OF CORRECTION

Patent No. 3,463,703 August 26, 1969

Gary J. Crandall

It is certified that error appears in the above identified patent and that said Letters Patent are hereby corrected as shown below:

Column 1, line 41, "fabriction" should read -- fabrication --. Column 2, line 31, "content" should read -- contact --; line 47, "smooth" should read -- smoother --; line 57, "rectangule" should read -- rectangle --. Column 3, line 25, after "said" insert -- protuberances contacting said --; same column 3, line 32, and column 4, line 8, "split", each occurrence, should read -- slit --. Column 3, line 35, "one" should read -- on --.

Signed and sealed this 11th day of August 1970.

(SEAL)
Attest:

Edward M. Fletcher, Jr.　　　　　　　　　　　　WILLIAM E. SCHUYLER, JR.
Attesting Officer　　　　　　　　　　　　　　　　Commissioner of Patents